United States Patent Office 3,463,664
Patented Aug. 26, 1969

3,463,664
GLASS ELEMENT FOR DOSIMETERS
Ryosuke Yokota, Yokohama-shi, Saburo Nakajima, Kawaki-shi, and Toshio Fukui and Kiyoshi Fukuda, Yokohama-shi, Japan, assignors to Tokyo Shibaura Electric Co., Ltd., Kawasaki-shi, Japan, a corporation of Japan
Filed Feb. 21, 1967, Ser. No. 617,570
Claims priority, application Japan, Feb. 28, 1966, 41/11,695, 41/11,698
Int. Cl. C03c 17/22, 23/00; C09k 1/04
U.S. Cl. 117—124                                    5 Claims

ABSTRACT OF THE DISCLOSURE

A glass element for dosimeters made of a glass consisting, as basic components, of 20 to 80% by weight of beryllium metaphosphate and 80 to 20% by weight of lithium metaphosphate, and silver metaphosphate in an amount of 1 to 10% by weight on the basic components. The glass element, when exposed to radiation and excited by ultra-violet radiation, emits fluorescence with an intensity corresponding to the dose of the applied radiation. The dose of radiation can be determined by measuring the intensity of the fluorescence.

---

Figure 1:
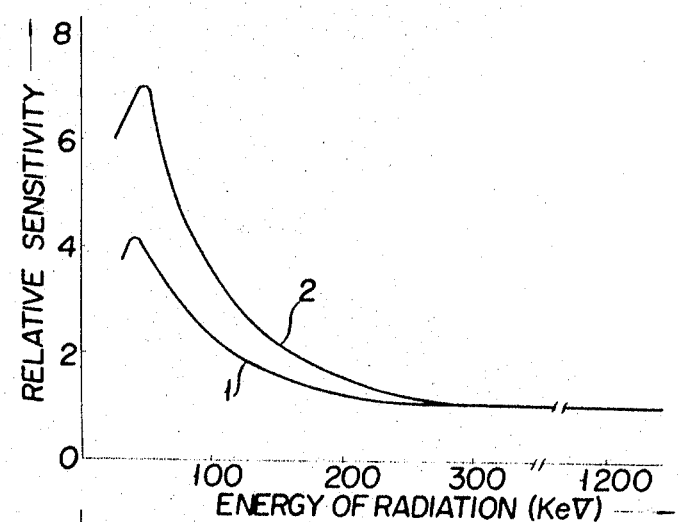

This invention relates to glass elements for dosimeters for measuring the dose of radiation such as beta-, gamma- or X-rays, and more particularly relates to such a glass element having a high sensitivity and a low energy dependency.

When a glass mainly composed of metaphosphate and containing silver or silver compounds is exposed to radiation, luminescent centers are created in the body of the glass in numbers proportional to the exposure dose. This exhibits a phenomenon wherein strong fluorescent light emanates according to the number of the luminescent centers thus created. Owing to this phenomenon, such glass is used as a radiation sensing element for dosimeters.

Known glass elements for this purpose include one made of a glass comprising, as basic components, 10 to 55%, by weight, of metaphosphate or sodium metaphosphate and 40 to 70%, by weight, of aluminum metaphosphate, added with silver metaphosphate in an amount of from 5 to 12 percent by weight on the basic components; and a glass comprising, as basic components, 25%, by weight, of potassium metaphosphate and 50%, by weight, of barium metaphosphate, added with silver metaphosphate in an amount of around 8% by weight on the components. As is well known in the art, these glass elements have such defects that the former exhibits a low energy dependency but has a poor sensitivity, and that the latter tends to induce an error in the measured value of the dose due to its nature of being influenced by the magnitude of energy, i.e. an energy dependency.

This invention provides a glass element for dosimeters which is made of a glass composed, as basic components, of 20 to 80 percent by weight of beryllium metaphosphate and 80 to 20 percent by weight of lithium metaphosphate with an addition of silver metaphosphate in an amount of from 1 to 10 percent by weight on the components, the beryllium metaphosphate acting as a new component.

The glass element obtained will have a higher sensitivity and a markedly reduced energy dependency when compared with a conventional glass element for dosimeters, thus enabling a low dose of radiation to be accurately measured. In addition, the element has a good durability against moisture and weathering, so that deterioration of its properties is not likely to occur due to secular changes. The moisture and weathering resisting properties of the element can be further promoted by a layer of tin oxide.

Accordingly, it is an object of this invention to provide a glass element for dosimeters having a high sensitivity and a low energy dependency.

Another object of this invention is to provide a glass element for dosimeters which allows little secular change, such as fading.

A further object of this invention is to provide a glass element for dosimeters having a good water resisting property.

Figure 2:
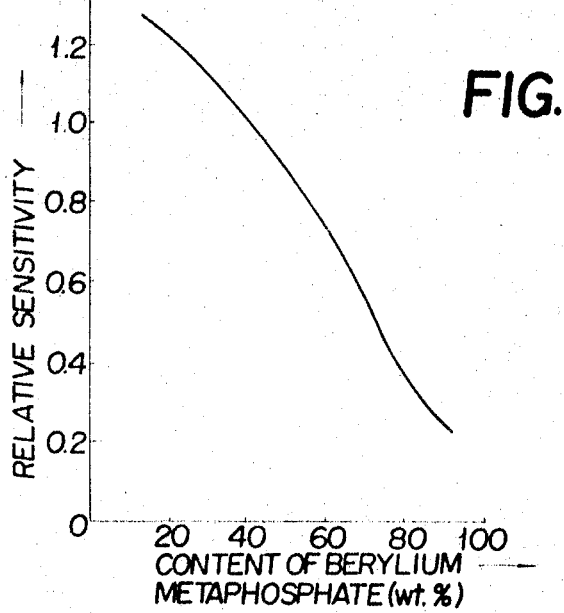

In the drawing:

FIG. 1 shows curves of the energy depending property of a glass element embodying this invention in comparison with that of a conventional one; and FIG. 2 shows a curve representing changes in sensitivity of the glass element of this invention at various rates of incorporation of beryllium metaphosphate.

The glass element for dosimeters according to this invention is composed of 20 to 80%, by weight, of beryllium metaphosphate and 80 to 20%, by weight, of lithium metaphosphate, as basic components, with an addition of silver metaphosphate in an amount equivalent to 1 to 10% by weight based on the components. These components are melted and solidified, and the glass obtained may be cut and polished into a desired shape by a known method.

The glass element of the above mentioned composition will exhibit a low energy dependency. FIG. 1 shows the energy dependency of a glass element having a diameter of 1 mm. and a length of 6 mm. and which is made of a glass of a basic composition of 50%, by weight, of beryllium metaphosphate and 50%, by weight, of lithium metaphosphate, as well as 2%, by weight, of silver metaphosphate based on the total weight of the composition. In FIG. 1, the energy dependency is represented by sensitivity per one roentgen at each energy level obtained when $\gamma$-rays from an irradiation source of cobalt 60 are emanated on the glass element or when X-rays having different effective energies obtained by attaching various filters to an X-ray tube are respectively irradiated to the glass element. The energy dependency of the glass element of this invention is shown by curve 1 and that of a conventional glass element is given by curve 2, the conventional element being composed of a basic composition of 53%, by weight, of aluminum metaphosphate and 47%, by weight, of lithium metaphosphate, with an addition of 6%, by weight, of silver metaphosphate based on the total weight of the composition. It is evident that the glass element of this invention provides a very low energy dependency particularly when the energy is small.

Although it is not fully understood why the glass element of this invention exhibits an energy depending property lower than that of the conventional glass element, it is believed that one of the reasons is due to the existence in the glass element of beryllium atoms whose atomic number is lower than that of aluminum.

As compared with the conventional glass element of potassium metaphosphate-barium metaphosphate-aluminum metaphosphate system, the glass element of this invention has, for example, a double value in the intensity of fluorescence when it is subjected to radiation and excited by ultra-violet rays. This intensity of fluorescence, namely, a relative sensitivity, is equivalent to the sensitivity of a glass element made of a glass consisting of a basic composition of 53% by weight of aluminum metaphosphate and 47% by weight of lithium metaphosphate, and 6% by weight of silver metaphosphate based on the total weight of the composition. FIG. 2 shows changes in sensitivity with varying compositions of the glass element of this invention. This glass element consists of a basic composition of lithium metaphosphate and beryllium metaphosphate, added with silver metaphosphate in an amount of 2 percent by weight on the total weight of the composition. The curve has been obtained by changing the mixing ratio between the beryllium metaphosphate and lithium metaphosphate of the basic composition and by measuring the sensitivity of each composition. The relative sensitivity shown in FIG. 2 is represented by a relative value when the sensitivity of a glass of a basic composition of 40% by weight of beryllium metaphosphate and 60% by weight of lithium metaphosphate is set at 1 (one).

In order to obtain a practically effective glass element without any trouble in production process, the proportion of beryllium metaphosphate in the basic glass composition, according to this invention, should be within the range of from 20 to 80% by weight. An excess amount of the beryllium metaphosphate over 80% will elevate the melting temperature of the glass, with the result that the melting process becomes a difficult one, while an amount of incorporation less than 20% will lower the durability against moisture so that the glass element is not durable in normal uses. The proportion of silver metaphosphate in the basic glass composition should range from 1 to 10% by weight based on the total weight of the composition. An amount less than 1% will not exhibit a proper sensitivity suffiicient for practical uses, while an excess of 10% will not only lower the sensitivity, but also cause the energy depending property to become unduly high irrespective of the composition in the basic components.

The glass forming the glass element may contain a proper amount of additives. The existence of magnesium metaphosphate of less than 5 percent by weight will improve the durability of the glass element against weathering, without lowering its sensitivity. Addition of aluminum metaphosphate in an amount less than 20% by weight will increase the sensitivity without worsening the energy dependency. The processibility of the glass may be improved by adding silica or alumina at a rate of less than 5 weight percent.

The glass element of this invention itself has a durability to water and weathering and sufficiently withstands to ordinary uses. The glass of the above mentioned composition has a deliquescence as the general nature of a metaphosphate glass. Thus, the surface of the glass element is preferably coated with a tin oxide film when it is used by being inserted into a living body.

Such a tin oxide film can be formed, for example, by depositing a tin chloride solution or an organic tin compound solution on the entire surface of the glass element, drying the surface and by causing the tin compound to undergo thermal decomposition. If the film coated on the element is from 10 to 500 m./$\mu$ thick, there will be no fear that the film is peeled off from the surface, so that the surface of the glass element can be protected fully from the attack of moisture. For this reason, the glass element having the tin oxide film is particularly suitable for use with dosimeters for personnel radiation monitor.

The glass elements for such purposes are to be fully washed and cleaned with water prior to the loading to a living body. But this cleaning operation tends to cause an expansion of tiny scratches present on the surface of the glass element, and the scattering of light beams on the expanded scratches will result in errors in the measurement of the exposure dose. However, the glass element of this invention can be effectively protected from the expansion of scratches when it is washed with water, since the surface is covered with the film of tin oxide which is insoluble to water.

The film of tin oxide will not hinder substantially the transmission of ultra-violet rays. For example, the film having a thickness of from 40 to 80 m./$\mu$ will reduce the permeability of ultra-violet rays having a wavelength of 365 m./$\mu$ by only 3%. Accordingly, the measured value of the dose obtained with the glass element coated with the tin oxide film will not differ substantially from that obtained with one having no such film, so that the difference is negligible.

The invention is further illustrated by the following examples in which all parts and percentages are by weight.

EAMPLE 1

70 parts of lithium metaphosphate, 25 parts of beryllium metaphosphate, 5 parts of magnesium metaphosphate and 3 parts of silver metaphosphate were melted at a temperature of 1050° C., mixed uniformly and cooled to solidify. It was found that the processibility of the glass obtained was superior to that of the conventional glass for glass elements, and that a glass element formed of the glass was 10% better in sensitivity than the convention glass element comprising, as basic components, 50% lithium metaphosphate and 50% aluminum metaphosphate, added with silver metaphosphate in an amount of 5 percent on the total weight of the components.

EXAMPLE 2

To a basic glass composition of 50% lithium metaphosphate and 50% berylium metaphosphate was added 8% of silver metaphosphate based on the basic composition. The mass obtained was then melted, mixed and solidified in the same manner as in Example 1.

A glass element made of the glass, due to a high proportion of the silver metaphosphate content, was found to be inferior in energy dependency and sensitivity to the glass element having the characteristics of the curve 1 in FIG. 1. It was also found that the glass element obtained was better in these characteristics than the conventional one, with a good processibility and satisfactory properties for practical uses.

EXAMPLE 3

Two glass elements of a different composition in accordance with this invention, as well as two glass elements of a prior art composition were prepared according to Table I below.

TABLE I.—COMPOSITION (IN PERCENT BY WEIGHT)

| Components | Specimens | | Comparing specimens | |
|---|---|---|---|---|
| | 1 | 2 | 1 | 2 |
| Lithium metaphosphate | 60 | 60 | 50 | 47 |
| Beryllium metaphosphate | 10 | 40 | | |
| Aluminum metaphosphate | 30 | | 50 | 53 |
| Silver metaphosphate | 5 | 5 | 7 | 0 |
| Boric acid | | | 3 | |

Specimens 1 and 2 were respectively heated at a temperature of 400° to 450° C. at which the entire surfaces thereof were coated by spraying with a 60% solution of stannic chloride, and were maintained at this temperature until the stannic chloride had been thermally decomposed. Through this treatment, high density tin oxide films of a thickness of 100 to 500 m/$\mu$ were produced.

The specimens and comparing specimens were irradiated by $\gamma$-ray radiation of fixed dose from a radiation source of cobalt 60. The intensity of fluorescence of each specimen was measured after it was excited by ultraviolet rays of a wavelength of 365 m/$\mu$, and the results of measurement are shown in Table II wherein comparison is made as the intensity of fluorescence of the comparing specimen 1 being 1.

TABLE II.—SENSITIVITY

| | Specimens | | Comparing specimens | |
|---|---|---|---|---|
| | 1 | 2 | 1 | 2 |
| Relative sensitivity | 1.30 | 1.25 | 1.0 | 1.1 |

What is claimed is:
1. A glass element for dosimeters which is made of a glass consisting of a basic component of 20 to 80% by weight of beryllium metaphosphate and 80 to 20% by weight of lithium metaphosphate, and silver metaphosphate in an amount of 1 to 10% by weight based on the basic component.

2. A glass element according to claim 1 wherein the basic component contains magnesium metaphosphate in an amount less than 5% by weight.

3. A glass element according to claim 1 wherein the basic component contains aluminum metaphosphate in an amount less than 20% by weight.

4. A glass element according to claim 1 wherein the basic component contains a metal oxide in an amount less than 5% by weight, said metal oxide being selected from the group consisting of silica and alumina.

5. A glass element according to claim 1 wherein said glass is covered with a stannic oxide film.

References Cited

UNITED STATES PATENTS

| 2,999,819 | 9/1961 | Blair | 106—47 XR |
| 3,118,788 | 1/1964 | Hensler | 106—47 XR |
| 3,294,700 | 12/1966 | Bedier et al. | 106—47 XR |

FOREIGN PATENTS 974,157   11/1964   Great Britain.

HELEN M. McCARTHY, Primary Examiner

U.S. Cl. X.R.

106—47; 250—83; 252—301.4, 408